United States Patent [19]
Fletcher et al.

[11] 3,795,862

[45] Mar. 5, 1974

[54] DEMODULATOR FOR CARRIER TRANSDUCERS

[76] Inventors: James C. Fletcher, Administrator of the National Aeronautics and Space Administration with respect to a invention of; Robert F. Roller, McMurray, Pa.

[22] Filed: Nov. 24, 1971

[21] Appl. No.: 201,700

[52] U.S. Cl.................. 324/118, 324/102, 329/50
[51] Int. Cl..................... G01r 19/22, G01r 27/28
[58] Field of Search......... 324/118, 102, 120, 99 D; 329/50; 330/10; 336/30; 340/199

[56] References Cited
UNITED STATES PATENTS

| | | | |
|---|---|---|---|
| 2,452,862 | 11/1948 | Neff | 336/30 |
| 3,149,282 | 9/1964 | Wasserman | 324/99 D |
| 3,210,746 | 10/1965 | Clapp | 340/199 |
| 2,591,738 | 4/1952 | Spencer | 324/102 |
| 2,624,770 | 1/1953 | Yetter | 324/102 |
| 3,327,219 | 6/1967 | Cunningham | 324/118 |
| 3,605,014 | 9/1971 | McCracken | 324/102 |

*Primary Examiner*—Rudolph V. Rolinec
*Assistant Examiner*—Ernest F. Karlsen
*Attorney, Agent, or Firm*—N. T. Musial; J. A. Mackin; John R. Manning

[57] ABSTRACT

A carrier type transducer is supplied with a carrier wave via an audio amplifier, a filter, a frequency divider and an oscillator. The carrier is modulated in accordance with the parameter being measured by the transducer and is fed to the input of a digital data system which may include a voltmeter. The output of the oscillator and the output of each stage of the divider are fed to an AND or a NAND gate and suitable variable and fixed delay circuits to the command input of the digital data system. With this arrangement, the digital data system is commanded to sample at the proper time so that the average voltage of the modulated carrier is measured and may be utilized with ancillary circuitry for control of the parameter being measured by the transducer.

9 Claims, 4 Drawing Figures

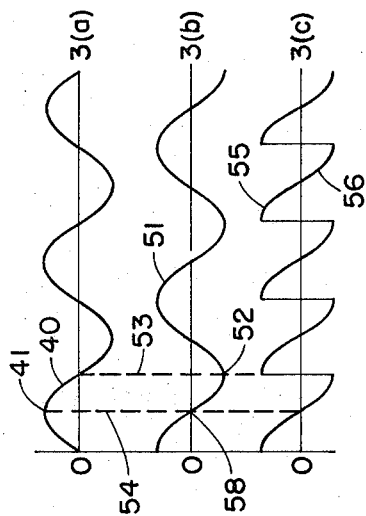
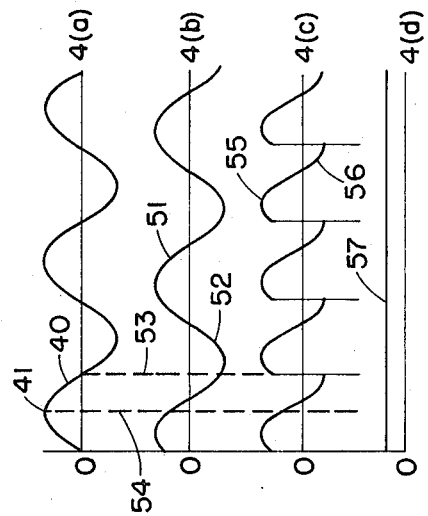
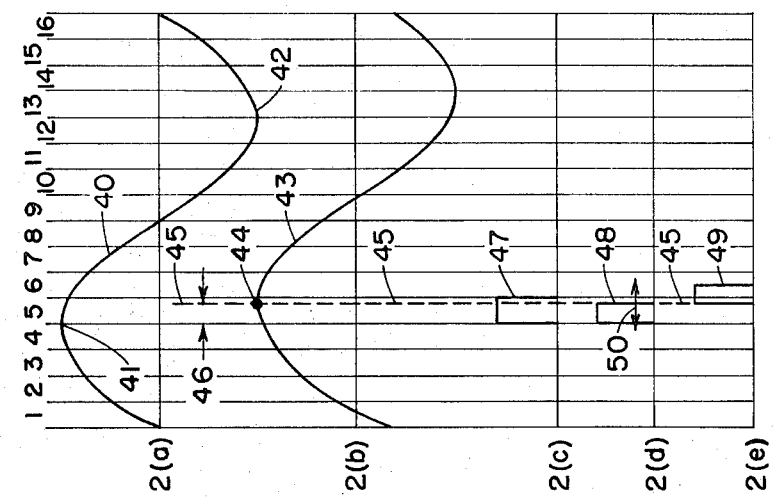

DEMODULATOR FOR CARRIER TRANSDUCERS

ORIGIN OF THE INVENTION

The invention described herein was made in the performance of work under a NASA contract and subject to the provision of Section 305 of the National Aeronautics and Space Act of 1958, Public Law 85–568 (72 Stat. 435, 42 U.S.C. 2457).

BACKGROUND OF THE INVENTION

The invention relates to demodulators and is directed more particularly to a demodulator utilizing digital techniques.

At the present time, it is a common practice to use for the measurement of pressure, displacement or acceleration, transducers which are energized or excited by an AC carrier wave. Such devices are usually linear variable displacement transducers or variable reluctance transducers which are excited by the AC signal. When other transducers are used in a radiation environment such as that emitted in the area of a nuclear reactor excessive drift of the electrical output signal usually results. Improvements have been made in carrier-driven transducers, improving drift by reducing the DC component to zero. However, when an AC carrier signal is utilized, the resultant signal is a modulated waveform from which the desired signal must be extracted. This is accomplished by using a demodulator which rectifies and averages the modulated output signal of the transducer in phase with the input stimulus to the transducer. Furthermore, before the demodulation occurs, the modulated signal must be brought into phase with the stimulus signal thus requiring phase shifting circuits which add complexity to the demodulator in addition to being relatively expensive. The demodulation is generally accomplished using synchronous bridge demodulators which are also expensive and complicated. Simple rectifier demodulators introduce unacceptable non-linearities for low level signals.

SUMMARY OF THE INVENTION

It is an object of the invention to provide a new and novel demodulator for carrier transducers.

It is another object of the invention to provide for a carrier type transducer, a demodulator which is simple and inexpensive as compared to those previously used.

Still another object of the invention is to provide for carrier transducers a demodulator utilizing digital circuitry and which is particularly adaptable for use with digital type readout systems.

It is yet another object of the invention to provide a demodulator system which can measure the average value or the instantaneous value of a transducer output carrier signal at a predetermined time during any cycle of the carrier wave.

An additional object of the invention is to provide a demodulator which extracts from a modulated carrier an analog of the stimulus of a transducer producing the modulated carrier without requiring the modulated carrier to be brought into phase with the carrier signal supplied to the transducer.

DESCRIPTION OF THE DRAWINGS

FIG. 2 is a graph illustrating the phase relationship and wave-shapes of some of the more important electrical signals in the demodulator;

FIG. 3 is a graph illustrating the phase relationships and wave-forms encountered in unstimulated phase-type carrier transducers when demodulated by conventional means; and FIG. 4 is a graph illustrating the phase relationships and waveforms associated with a statically-stimulated phase-type carrier transducer when demodulated by conventional means.

DESCRIPTION OF A PREFERRED EMBODIMENT

Figure 1:
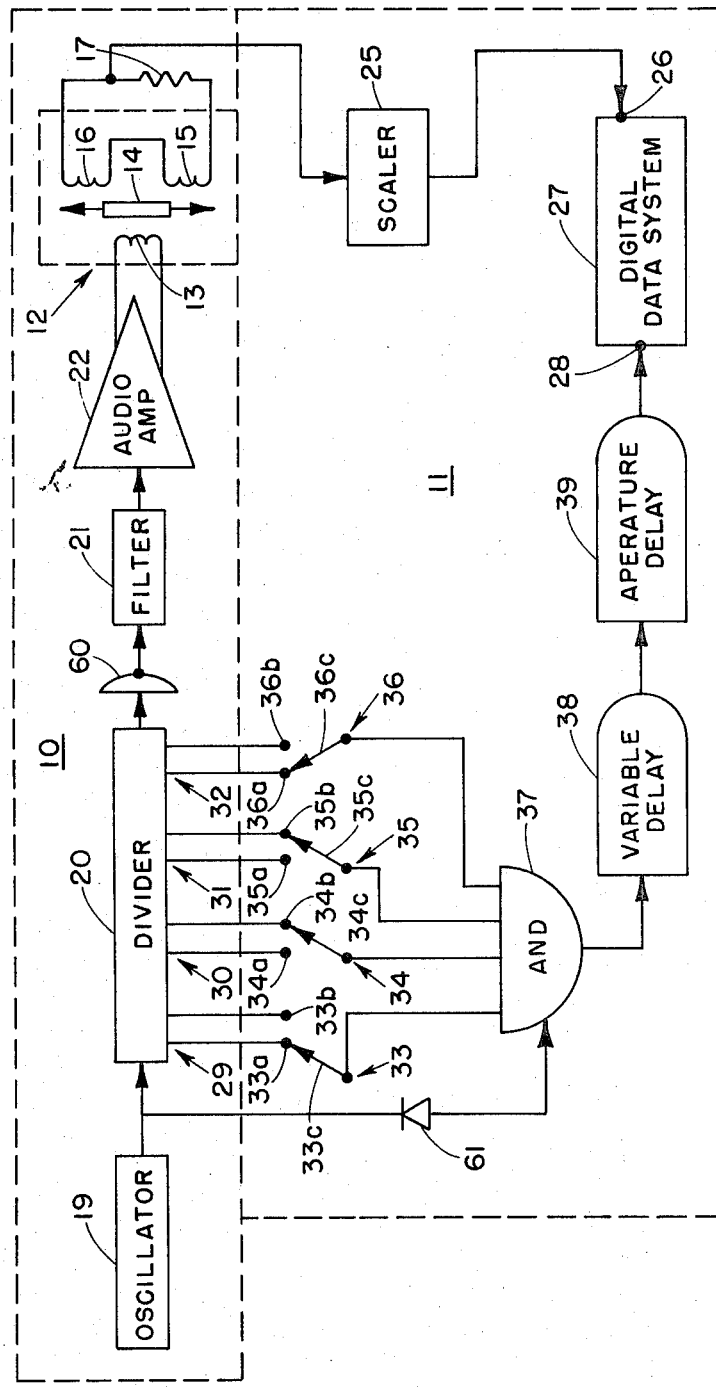
FIG. 1 is a block diagram of a demodulator embodying the invention.

Referring now to FIG. 1, it will be seen that a demodulator embodying the invention includes generally a signal channel section 10 and a demodulator section 11 as defined by the dashed lines. An alternating current signal or carrier is supplied to a carrier transducer 12 such as a linear variable differential transformer (LVDT), the carrier being applied to a primary winding 13 of the transducer 12. Movement of a core element 14 in response to a parameter such as acceleration or fluid pressure, for example, varies the magnitude of the carrier signal coupled to a pair of differential windings 15 and 16 such that a modulated carrier wave appears across a resistor 17 which develops the output signal from the differential windings 15 and 16. To extract the parametric signal from the carrier wave, demodulation circuitry must be provided.

The carrier signal is derived from an oscillator 19, the output signal of which is fed into a divider circuit 20. The output signal of the divider is a square wave which is converted to sinusoidal form by directing it through a filter 21. The power of the sinusoidal output voltage of filter 21 is increased by feeding it through an audio amplifier 22 which is connected directly to the winding 13 of the transducer 12.

The modulator carrier which appears across resistor 17 is directed through a scaler 25 to a signal input terminal 26 of a digital voltmeter 27. Some storage means, such as a sample-and-hold amplifier could replace the digital data system 27. As will be explained presently, by applying a command signal to a command input terminal 28 of the digital data system 27 at a prescribed time, the average value of the parametric signal appearing across resistor 17 will be measured by the digital data system 27.

To this end, the divider 20 is provided with paired outputs 29, 30, 31 and 32. Divider output 29 is connected to fixed contacts 33a and 33b of a switch 33 having a movable contact 33c; divider output 30 is connected to fixed contacts 34a and 34b of a switch 34 having a movable contact 34c; divider output 31 is connected to fixed contacts 35a and 35b of a switch 35 having a movable contact 35c and divider output 32 is connected to fixed contacts 36a and 36b of a switch 36 having a movable contact 36c. The movable contacts 33c, 34c, 35c and 36c are all connected as inputs into an AND gate 37.

Each of the paired outputs 29 through 32 of the divider 20 is taken from both the negation and assertion outputs of flip-flops in a binary divider chain such as a Texas Instrument Model 7493. Accordingly, when voltage is present at any of the fixed contacts of switches 33 through 36, the other fixed contact will have zero voltage. Because the divider has four binary outputs and because the movable contacts 33 through 36 each have two positions, the output of the AND gate 37 will be activated on any one of 16 possible time segments which occur during any one cycle of the carrier wave. The particular segment selected during which there will be an output from AND gate 37 is dependent upon the positions of the movable contacts 33c through 36c. The output of AND gate 37 is fed through a varible delay circuit 38 and a fixed or aperture delay circuit 39 to the command terminal 28 of the digital data system 27. The delay circuits 38 and 39 may be monostable multivibrators such as commercially available Texas Instruments Model 74121.

The circuit is completed by a NAND gate 60 connected between divider 20 and filter 21 and a diode 61 connected from the oscillator 19 output to an input of the AND gate 37. NAND gate 60 serves as a clipper of the square wave being supplied to filter 21. Diode 61 transmits a portion of the oscillator output to the input of gate 37 to prevent this gate from detecting phantom states which occur in divider 20 during its counting cycle.

Referring to FIG. 2, there is shown at 2a one cycle 40 of the carrier wave generated by oscillator 19 of FIG. 1, the cycle being divided, as shown, into 16 time segments each corresponding to 22.5° of the sinusoidal carrier wave. The carrier signal attains its maximum positive peak value at 41 which occurs at the end of time segment number 4 while the maximum negative peak 42 occurs at the end of time segment number 12.

FIG. 2(b) illustrates one cycle of the modulated carrier wave 43 which is the output of transducer 12 as it appears across resistor 17. Waveshape 43 differs from the carrier 40 in that its magnitude varies from cycle to cycle in accordance with movement of core 14 and that it is of slightly shifted phase relationship to carrier 40 in that the peak positive voltage 44 of waveshape 43 falls on vertical dashed line 45 resulting in a phase shift as shown at 46.

With the switches 33 through 36 set as shown in FIG. 1, the AND gate 37 will produce an output pulse 47 as shown in FIG. 2(c). This pulse has a leading edge corresponding to the end of time segment 4 and a trailing edge corresponding to the end of time segment 5 and is fed to the monostable multivibrator 38.

As known to those skilled in the art, a monostable multivibrator produces an output pulse whose leading edge corresponds to the input trigger signal and whose trailed edge may be advanced or retarded timewise by adjustment of a potentiometer in a timing network of the multivibrator. Delay circuit 38 in the preferred embodiment of the invention is such a multivibrator and produces an output pulse 48 whose trailing edge may be varied as indicated by arrow 50. The trailing edge of pulse 48 triggers the monostable multivibrator 39 which produces an output pulse 49.

The pulse 49 is of constant width and therefore delay circuit 39 need not be adjustable. However, the timing components of delay circuit 39 must be selected to that pulse 49 is about 10 microseconds wide when the output frequency of oscillator 19 is 80 KHz as in the instant case where the transducer 12 is of a popular type requiring a 5 KHz stimulus signal. This is because pulse 49 is fed to the command input terminal 28 of the digital voltmeter 27 and thus determines the voltmeter aperture time, that is the period of time during which the voltmeter 27 will be measuring the output voltage of transducer 12. Where the modulated output 43 is being measured at its peak, as at 44 of FIG. 2(b), the pulse 49 may be relatively wide because the slope or rate of change of wave 43 is very small on either side of maximum 44. Accordingly, although as shown in FIG. 2 the leading edge of pulse 49 and the trailing edge 50 of pulse 48 fall on the dashed vertical line 45, the delay circuit 38 should preferably be adjusted to center pulse 49 on dashed line 45. In practice this is achieved by adjusting circuit 38 to produce a maximum reading on the digital voltmeter 27 when the transducer 12 is stimulated by a static but nonzero input. Thus the digital data system samples the peak value of the modulated carrier at 90° of its sinusoidal variation and, due to the scaler 25 which reduces the magnitude of the modulated carrier applied to input terminal by a factor of 1.57, reads the average value of the modulated carrier. The digital data system may supply the average value to ancillary circuits such as, for example, circuits which control the parameters being measured by the transducer 12.

The circuitry of the invention may also be used with a transducer which produces an output signal of constant amplitude but whose phase relationship to the carrier input varies in accordance with the stimulus parameter applied to the transducer. Consider FIG. 3, in which the phase of the transducer output signal 51 is shifted with respect to the carrier 40 as a function of mechanical stimulus amplitude being constant. For the case shown in FIG. 3b, no parametric stimulus such as motion or heat is applied to the transducer and a net output of zero is obtained as shown by 55 and 56 because the transducer shifts phase exactly 90° as shown by peak 52 of the phase modulated wave 51 which lies on vertical dashed line 53 while peak 41 of the carrier wave 40 lies on vertical dashed line 54. In FIG. 4b, the stimulus has resulted in a phase shift less than 90° from the carrier wave 40. Performing rectification according to the rules and mathematics of the prior art demodulator circuits yields a positive output 57 because the areas 55 are greater than areas 56. If the output had shifted more than 90°, a negative signal would have resulted at the demodulator output.

To demonstrate that synchronous sampling of the instant invention will demodulate either an amplitude modulated carrier wave or a phase modulated carrier wave, consider the waveforms of FIG. 2. It is obvious that if the transducer output 43 were phase corrected (i.e., in phase with the carrier) prior to rectification and filtering, and if it were sampled at exactly the correct time using a very narrow aperture sampling system, a value equal to the average voltage ($V_{avg}$) of the rectified and filtered signal could be obtained. For the amplitude modulating type transducer, this optimum point 0.637 ($V_{max}$) is at 39.5 (or 140.5)° of the phase-corrected transducer output, since this signal is closely sinusoidal in practice. This occurs because the average value of a single half cycle of a sinusoid is directly related to the peak value:

$$V_{avg} = \frac{2V_{pk}}{\pi} \int_0^{\pi/2} \sin\phi \, d\phi = \frac{2}{\pi} V_{pk} = .637 V_{pk} \quad (1)$$

If $\phi_1$ is the angle at which $V_{avg}$ is obtained for a sinusoid, $$\phi_1 = \text{Arc sin } 0.637 = 39.5° \text{ (or } 140.5°)$$

(2)

Further, since the output is phase corrected to the carrier input, the average value of the output signal may be obtained by sampling it when the carrier signal passes through 39.5°. Also, since phase correction merely refers to time correction of the transducer output, if the phase relation to be corrected is constant, some alteration in the angular value of the sampling point will produce phase correction simultaneous with sampling. No extra circuit would be required.

Because for a sinusoid the amplitude for any portion of the waveform can be related to the peak amplitude merely by knowing the angular relationship, sampling need not be performed at exactly 39.5° (or the phase-corrected equivalent). By sampling the signal near its peak, at 90°, where the rates of change are not as drastic the value obtained may then be scaled down by the fixed ratio $2/\pi$ to obtain the correct value.

Consider the waveforms of FIGS. 3 and 4, relating to the phase shifting type transducer. Again, as in the case of the amplitude modulating transducer, sampling could be accomplished as the signal passes through its average value, but the angular or phase relationship here is different from that previously discussed with regard to amplitude modulated carriers. If it is assumed that sampling occurs at the peak 41 of the carrier input signal 40 ($\phi=\pi/2$ radians), the correct sampling point is obtained for that of no input stimulus as shown at 48 in FIG. 3(b), where the value of 51 is zero. Consider FIG. 4(b), for the case where the phase shift is any value. Assuming sampling still occurs at $\phi=\pi/2$ radians which falls on vertical dashed line 54 the amplitude seen on the output signal is $$V_{out} = K (\sin 90 + \theta)$$
$$= K (\sin 90° \cos \theta + \cos 90° \sin \theta) = K \cos \theta \quad (3)$$

The constant factor K will be evaluated subsequently. Next, the manner in which an analog demodulator would operate on the rectified transducer output of FIG. 4(b) would be to average it over a half-cycle of the input carrier wave.

$$V_{avg} = \frac{V_{max}}{\pi} \int_0^\pi \sin(\phi+\theta)d\phi$$
$$= \frac{V_{max}}{\pi} \int_0^\pi \sin\phi \cos\theta + \sin\theta \cos\phi)d\phi \quad (4)$$

However, the second term of this expression clearly is zero-valued over these limits. Thus equation (4) becomes:

$$V_{avg} = \frac{V_{max}}{\pi} \int_0^\pi \sin\phi \cos\theta \, d\phi = \frac{VV_{max} \cos\theta}{\pi}[-\cos]_0^\pi \quad (5)$$
$$= \frac{2V_{max} \cos}{\pi} \quad (6)$$

If $\theta=0$, the phase shifting type transducer output is in phase with the input, and $$V_{avg} = 2V_{max}/\pi = K, \text{ where K is}$$

the constant of equation (3). (7)

Thus, since the average voltage is always equal to the sampled voltage, if the sample is taken at 90° of the carrier input and scaled by the factor $2/\pi$ synchronous sampling at this point will produce the desired results.

In summary, for either the amplitude modulating type or phase shifting type transducer (and consequently for any type linear combination of the two types) synchronous sampling at 90 degrees of the carrier input waveform, with subsequent scaling by a factor $2/\pi$ produces exactly the same output signal as conventional demodulation by rectification and filtering.

ALTERNATE EMBODIMENTS OF THE INVENTION

The circuit shown in FIG. 1 minimizes the number of required binary stages in the divider 20 by measuring the modulated carrier at its 90° value and then scaling this down by a factor of 1.57 to obtain the average value. It may be shown mathematically that a sine wave passes through its average value, that is 0.637 times its peak value, at 39.5°, 140.5°, 219.5° and 320.5°. Thus by sampling the modulated carrier at, for example, 39.5° of its phase angle, the average value would be obtained. However, to sample at the 39.5° angle requires that each cycle of the carrier be divided into 128 segments of 2.8° each, and the fifteenth segment sampled.

Accordingly, an alternate embodiment which would measure the modulated carrier at 39.5° may include an oscillator 19 having an output frequency of 640 KHz and a divider 20 having seven binary stages so that the oscillator frequency is divided by a factor of 128 to provide a 5 KHz square wave to filter 21. The divider would provide seven binary outputs connected to the AND gate 37. Other circuitry would remain the same except for the elimination of scaler 25 which is no longer required inasmuch as the modulated carrier is being measured at its average value rather than at its peak value.

It will be understood that the foregoing circuitry may be changed or modified by those skilled in the art to which the invention pertains without departing from the spirit and scope of the invention as set forth in the claims appended hereto.

What is claimed is:

1. Circuitry for demodulating a transducer-modulated carrier wave representative of a parameter being measured comprising:
   a carrier type transducer having input means and output means;
   sinusoidal generating means connected to said transducer input means for applying a sinusoidal carrier signal thereto,
   said sinusoidal generating means comprising:
   an oscillator, a frequency divider having input means and output means and a plurality of divider stages, each stage having a binary output, means for connecting said oscillator to said input means of said frequency divider, sinusoidal filter means, amplifier means having input means and output means, means for connecting said filter means between said output means of said frequency divider and said input means of said amplifier and means for connecting said output means of said amplifier to said input means of said transducer;
   a digital data system having an input connected to said transducer output means to receive a modulated carrier wave therefrom; and
   means for commanding said digital data system to measure the magnitude of the modulated carrier signal at a prescribed time of each cycle of the modulated carrier signal, said means for commanding comprising an AND gate having output means and a plurality of input means, means for connecting said binary outputs of said divider to respective ones of said plurality of input means of said AND gate, and means for connecting said output means of said AND gate to a command signal input of said digital data system through a variable delay means and fixed delay means.

2. The circuit of claim 1 wherein said means for connecting said binary outputs to said inputs of said AND gate comprises a plurality of switches or jumpers each having a pair of fixed contacts connected to a respective binary outputs of said divider and a movable contact connected to a respective one of said plurality of said input means of said AND gate.

3. The circuit of claim 1 wherein said divider includes four binary outputs and said oscillator provides an output carrier having a frequency of 80 KHz.

4. The circuitry of claim 1 wherein said transducer is of the amplitude modulating type and wherein said prescribed time of each cycle is 39.5°.

5. The circuit of claim 1 and further including scaler means connected between said output means of said digital data system to reduce by a predetermined amount the magnitude of the modulated carrier being applied to said digital data system.

6. The circuit of claim 1 and further including control means responsive to said digital data system for adjusting the parameter being measured by said transducer.

7. A method of demodulating a carrier wave comprising the steps of:

generating a first voltage waveshape of predetermined frequency;

dividing the first voltage waveshape to produce a plurality of square waves of different frequencies each of which is a submultiple of the first voltage waveshape;

filtering the lowest frequency one of said square waves to produce a sinusoidal waveshape;

modulating said sinusoidal waveshape in accordance with a parameter being measured;

combining said square waves to produce a square pulse which occurs at a predetermined time during each cyclic alternation of the sinusoidal wave;

varying the trailing edge of said square pulse timewise until it coincides with a predetermined phase angle of said sinusoidal wave;

supplying said modulated sinusoidal wave to a commandable indicator; and measuring said modulated sinusoidal voltage at each occurrence of the trailing edge of said square pulse.

8. The method of claim 7 wherein said phase angle of said sinusoidal wave is 39.5°.

9. The method of claim 7 wherein said phase angle of said sinusoidal wave is 90° and including the additional step of scaling down said modulated sinusoidal wave by a factor of $2/\pi$ before said modulated sinusoidal wave is measured.

* * * * *